(12) United States Patent
Liu et al.

(10) Patent No.: US 11,234,560 B2
(45) Date of Patent: Feb. 1, 2022

(54) BLENDER WITH PRESSURE CONTROL

(71) Applicant: Greenfield World Trade, Inc., Fort Lauderdale, FL (US)

(72) Inventors: Rong Liu, Fort Lauderdale, FL (US); Bo Xu, Fort Lauderdale, FL (US); Chunwen Hu, Fort Lauderdale, FL (US)

(73) Assignee: GREENFIELD WORLD TRADE, INC., Fort Lauderdale, FL (US)

( * ) Notice: Subject to any disclaimer, the term of this patent is extended or adjusted under 35 U.S.C. 154(b) by 226 days.

(21) Appl. No.: 16/524,482

(22) Filed: Jul. 29, 2019

(65) Prior Publication Data
US 2020/0029741 A1 Jan. 30, 2020

Related U.S. Application Data

(60) Provisional application No. 62/711,702, filed on Jul. 30, 2018.

(51) Int. Cl.
*B22C 5/00* (2006.01)
*A47J 43/07* (2006.01)
*A47J 43/046* (2006.01)

(52) U.S. Cl.
CPC ......... *A47J 43/0761* (2013.01); *A47J 43/046* (2013.01); *A47J 43/0722* (2013.01)

(58) Field of Classification Search
CPC .. A47J 43/046; A47J 43/0722; A47J 43/0761; A47J 43/085; A47J 43/0716; A47J 43/04
See application file for complete search history.

(56) References Cited

U.S. PATENT DOCUMENTS

| | | | |
|---|---|---|---|
| 8,393,262 B1 | 3/2013 | Molayem | |
| 9,675,212 B2* | 6/2017 | Hewitt | B65D 81/38 |
| 9,687,111 B1 | 6/2017 | Trojan | |
| 9,924,837 B1* | 3/2018 | Trojan | A47J 43/0716 |
| 2015/0059289 A1 | 3/2015 | Cody | |
| 2015/0098298 A1* | 4/2015 | Sapire | A47J 43/0766 366/144 |
| 2015/0117139 A1* | 4/2015 | Conti | B01F 7/00725 366/146 |

FOREIGN PATENT DOCUMENTS

| | | |
|---|---|---|
| CN | 203041805 U | 7/2013 |
| CN | 204120868 U | 1/2015 |
| CN | 105686701 A | 6/2016 |
| KR | 101670026 B1 | 10/2016 |

* cited by examiner

*Primary Examiner* — Anshu Bhatia
*Assistant Examiner* — Gregory Y Huan
(74) *Attorney, Agent, or Firm* — Michael E. Dockins; Shumaker, Loop & Kendrick, LLP

(57) ABSTRACT

A blender for blending food products includes a vessel configured for containing the food products and a cutter blade base having a cutter blade assembly. The cutter blade base releasably coupled to and cooperating with the vessel to seal the food products within the vessel and blend the food products. The cutter blade assembly is driven by a drive device. A pressure minimizing device prevents an overaccumulation of pressure within the vessel as the food products are blended therein.

7 Claims, 5 Drawing Sheets

BLENDER WITH PRESSURE CONTROL

CROSS-REFERENCE TO RELATED APPLICATIONS

This application claims the benefit of U.S. Provisional Application No. 62/711,702, filed Jul. 30, 2018. The entire disclosure of the above application is incorporated herein by reference.

FIELD OF THE INVENTION

This invention relates broadly to blenders and, particularly, blenders with pressure control.

INTRODUCTION

Personal blenders are known for blending various food products such as fruits vegetables, juices, liquids, powders, ice, and other food products into a drinkable liquid. Most blenders are considered a kitchen countertop appliance. Personal blenders are typically portable, compact, and ideal for a single-user. The personal blenders typically have a sealed single cup vessel or container that couples to the base. The base includes the drive device and working parts that is mechanically coupled to a blade. A user fills the container with the desired food products, places the container on the base, and activates the blade to rotate and thus blend the food products together in the container.

However, in most personal blenders, there exists no pressure control. With high drive device power, high blending revolutions per minute (RPM) of the blade, and longer blending times, the sealed vessel can generate undesired amounts of heat and pressure. The heat and pressure begins to increase inside the vessel which, in turn, leads to a pressure build up or overaccumulation of pressure within the vessel and causes the vessel to crack or explode. In other cases, the vessel may be difficult to open due to the overaccumulation of pressure therein which may not be ergonomically friendly to a user. Furthermore, it is possible that cool or hot liquid may leak unexpectedly because of the heat and pressure build up.

Therefore, it would be desirable to have a personal blender with pressure control while maintaining blending efficiency.

SUMMARY OF THE INVENTION

Concordant and congruous with the present invention, a personal blender with pressure control that maintains blending efficiency has surprisingly been discovered.

In an embodiment of the invention, a blender for blending food products is disclosed. The blender includes a vessel configured for containing the food products and a cutter blade base having a cutter blade assembly. The cutter blade base is releasably coupled to and cooperating with the vessel to seal the food products within the vessel and blend the food products. The cutter blade assembly is driven by a drive device. A pressure minimizing device prevents an overaccumulation of pressure within the vessel as the food products are blended therein.

In another embodiment, a blender for blending food products includes a bottom housing containing a drive device and a cutter blade base having a cutter blade assembly driven by the drive device. The cutter blade base is releasably received in the bottom housing, wherein a continuous operation of the cutter blade assembly does not exceed a predetermined interval of time. A vessel is configured for containing the food products. The vessel having an open end and a closed end. The open end is releasably coupled to the cutter blade base. A pressure relief valve is disposed in one of the vessel and the cutter blade base.

In yet another embodiment of the invention, a method of controlling an overaccumulation of pressure within a vessel of a blender for blending food products is disclosed. The method includes the steps of coupling an open end of a vessel to a cutter blade base. The cutter blade base includes a cutter blade assembly configured to blend the food products within the vessel. The method additionally includes the step of positioning the cutter blade base in mechanical communication with a drive device. The method further includes the step of controlling a pressure in the vessel from exceeding a predetermined pressure when the food products are being blended within the vessel.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

"A" and "an" as used herein indicate "at least one" of the item is present; a plurality of such items may be present, when possible. As used herein, "substantially" means "to a considerable degree," "largely," or "proximately" as a person skilled in the art in view of the instant disclosure would understand the term. Spatially relative terms, such as "front," "back," "inner," "outer," "bottom," "top," "horizontal," "vertical," "upper," "lower," "side," "up," "down," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
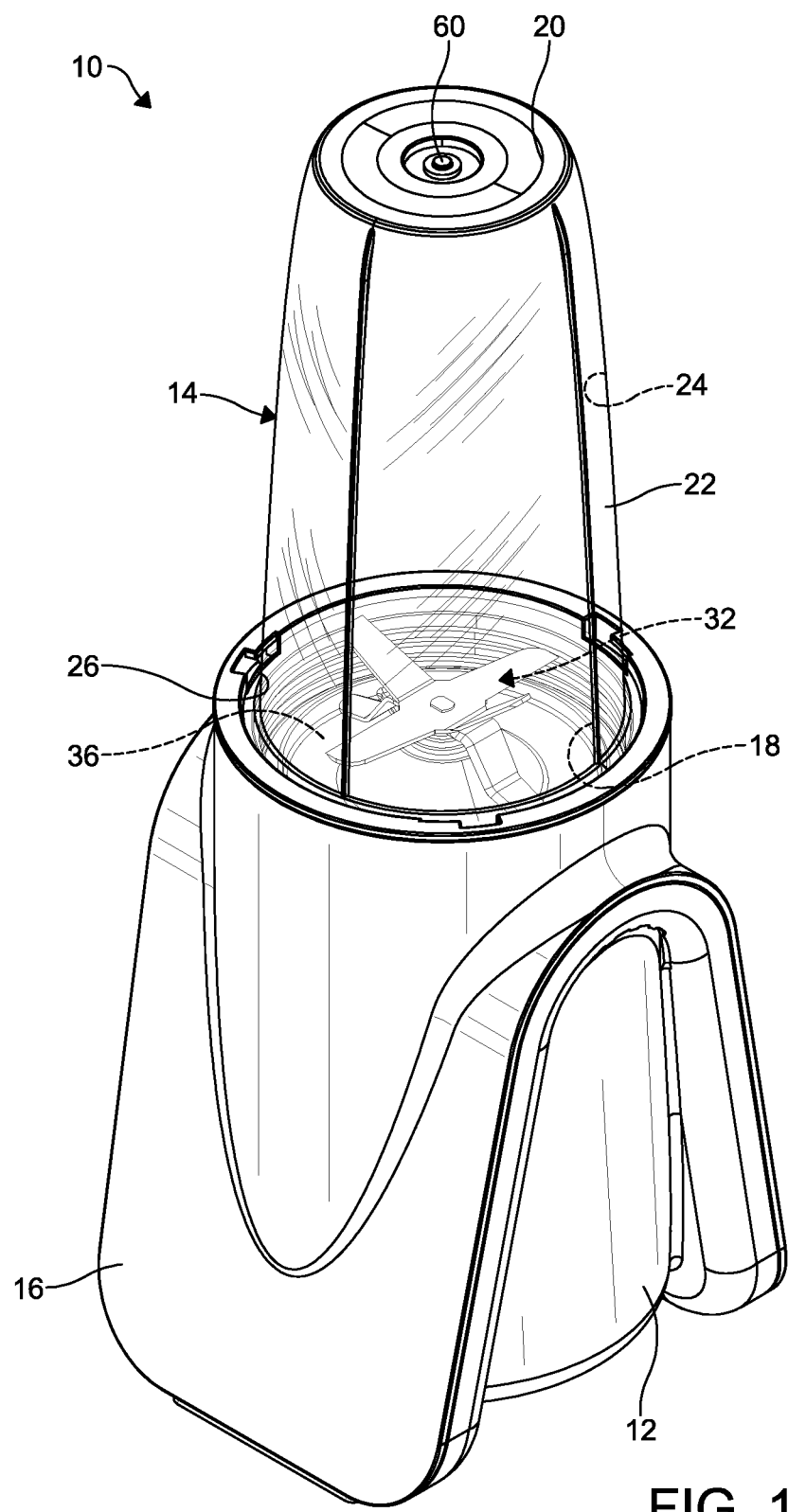
FIG. 1 is a front perspective view of a blender according to an embodiment of the disclosure.
Figure 2:
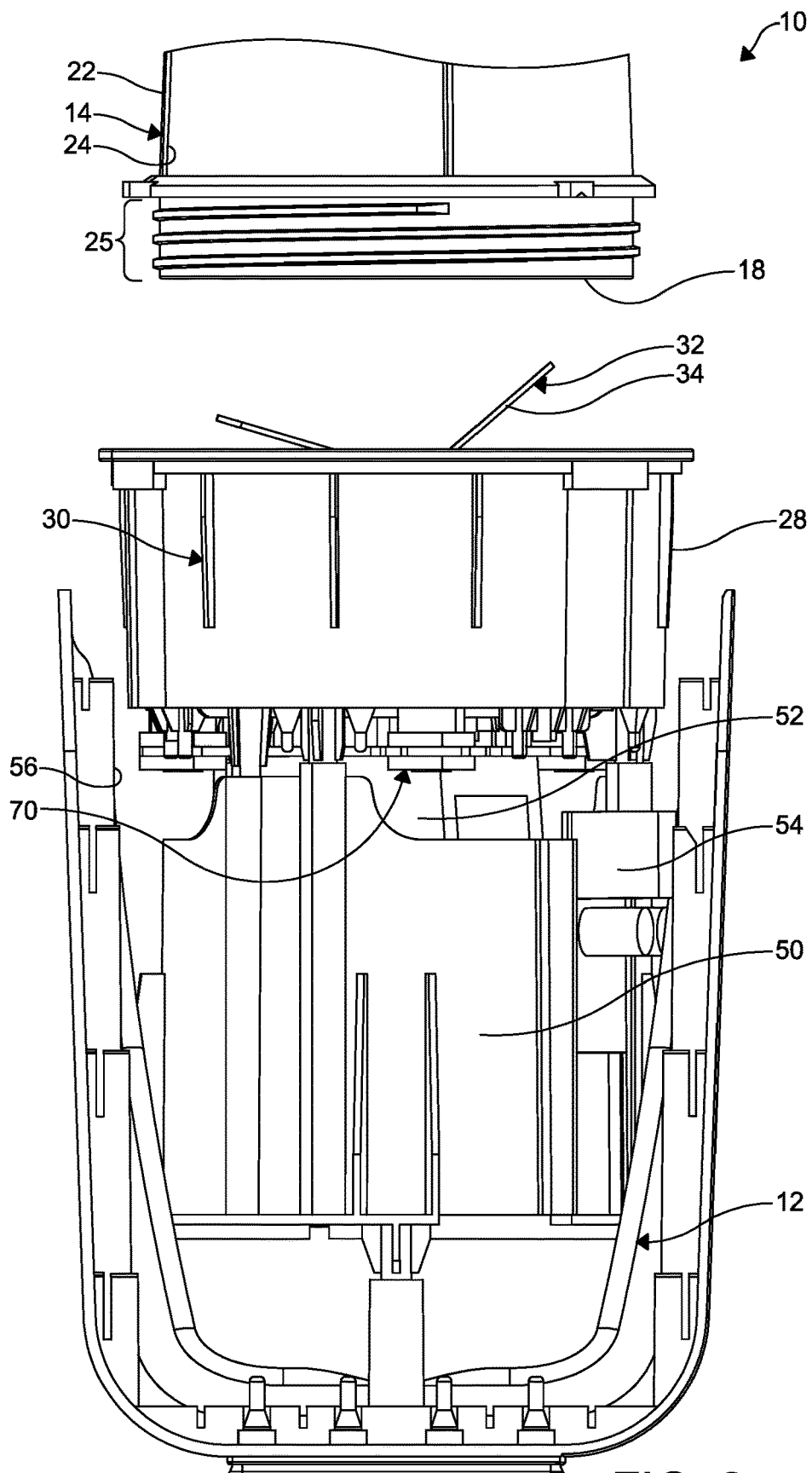
FIG. 2 is a fragmentary partially exploded front elevational view of the blender of FIG. 1, wherein a housing cover of the blender is removed to show internal components of a bottom housing of the blender.
Figure 3:
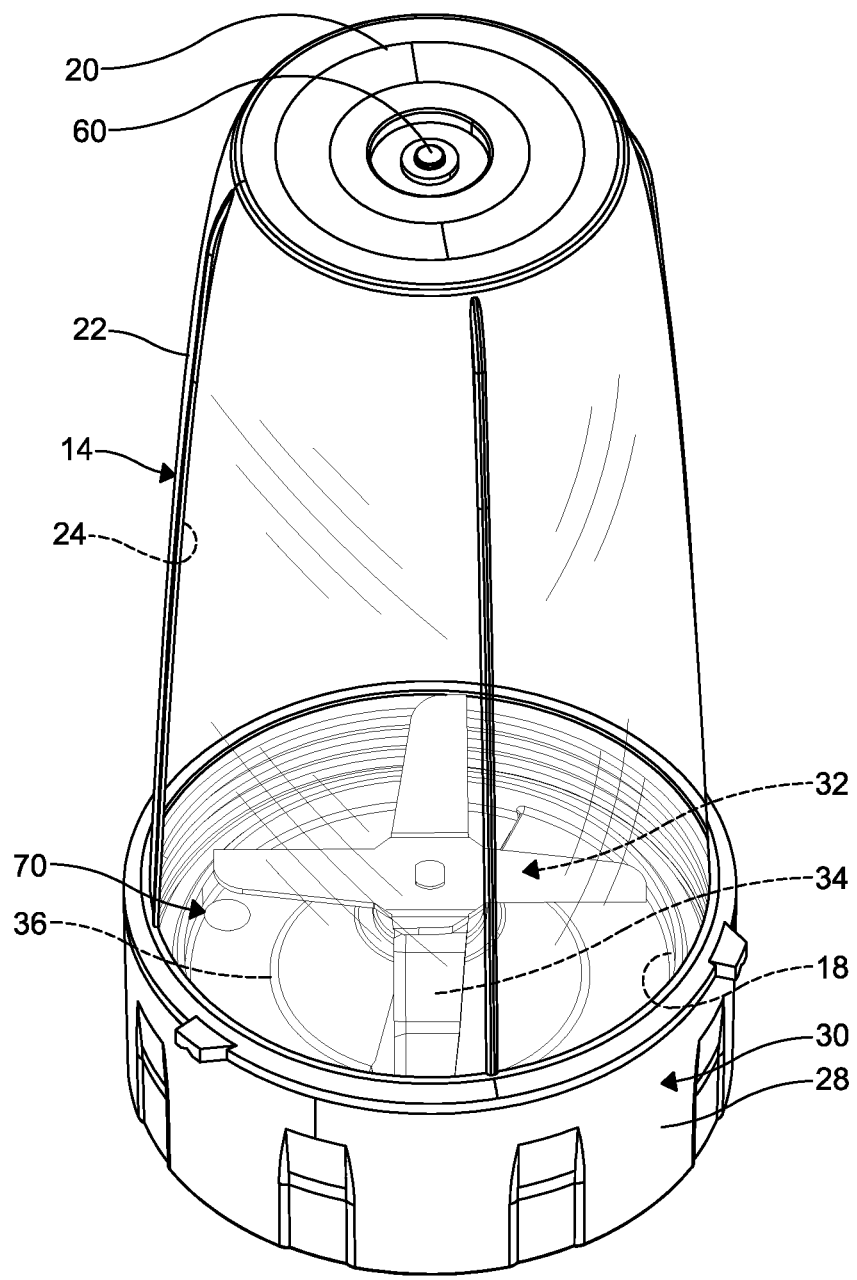
FIG. 3 is a top perspective view of a vessel and a cutter blade base receiving a cutter blade assembly of the blender of FIG. 1.
Figure 4A:
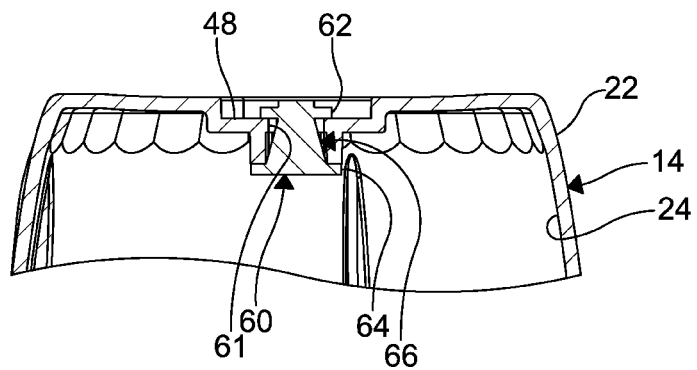
FIG. 4A is a fragmentary front elevational cross-sectional view of the vessel of the blender of FIGS. 1-3.
Figure 4B:
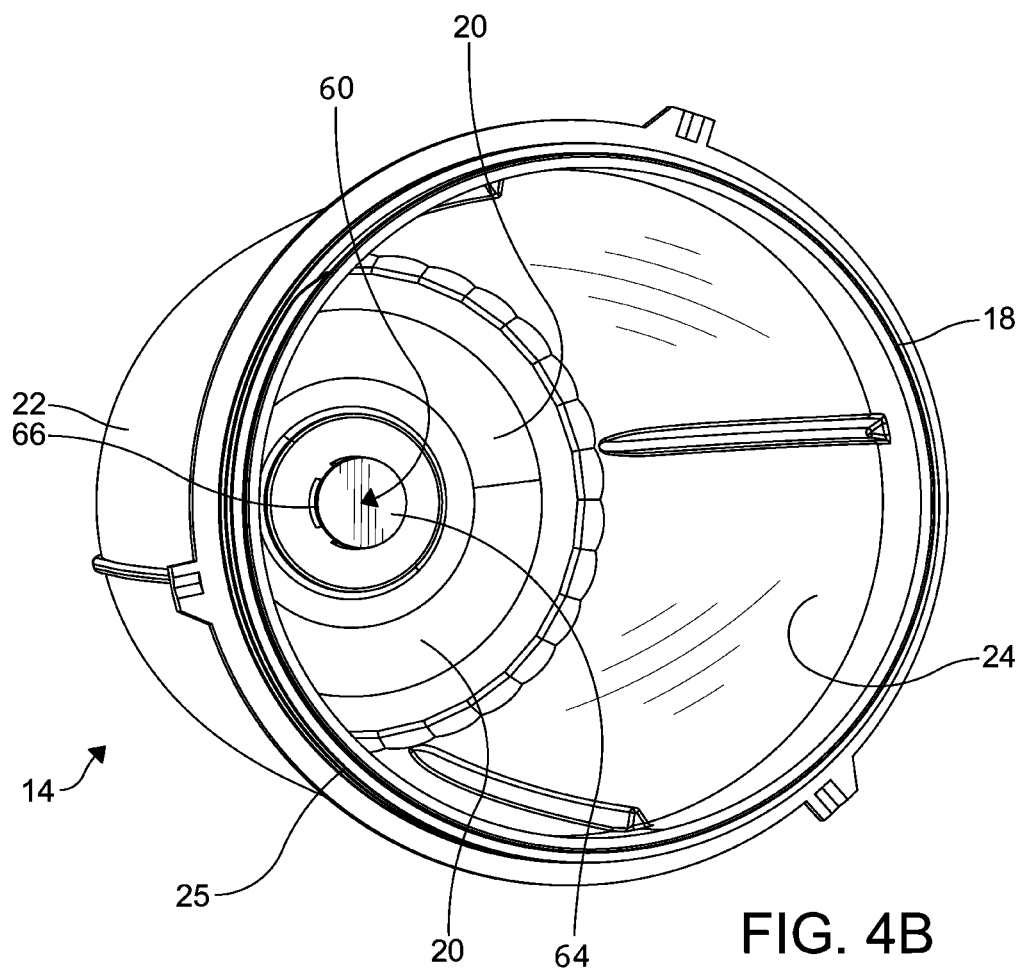
FIG. 4B is a fragmentary bottom perspective view of the vessel of the blender of FIGS. 1-3.
Figure 5A:
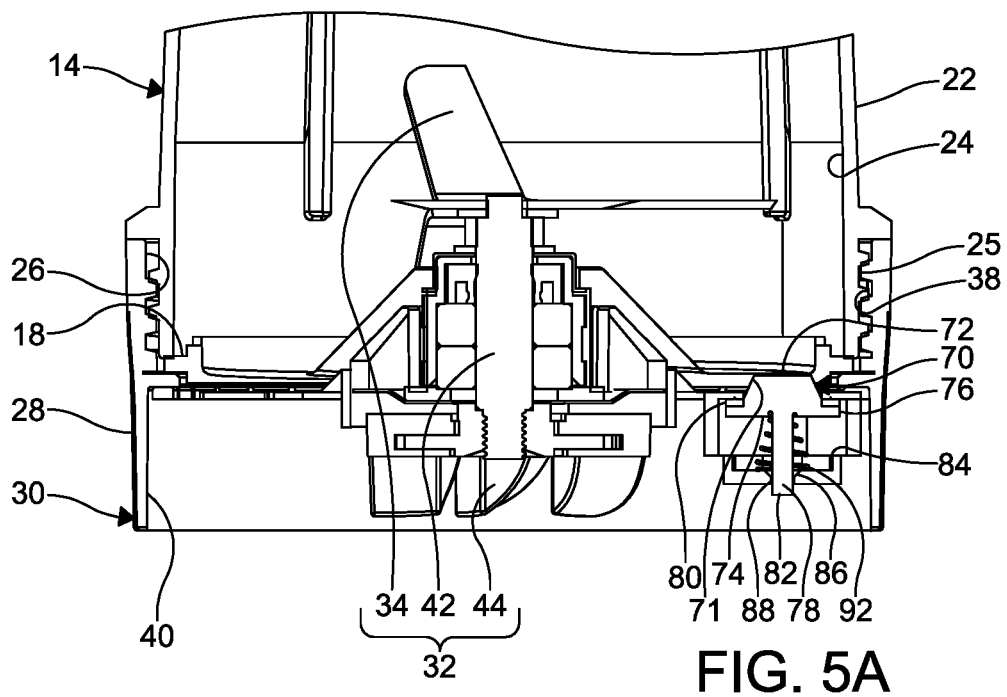
FIG. 5A is a fragmentary front elevational cross-sectional view of the vessel and the cutter blade base of the blender of FIGS. 1-3.
Figure 5B:
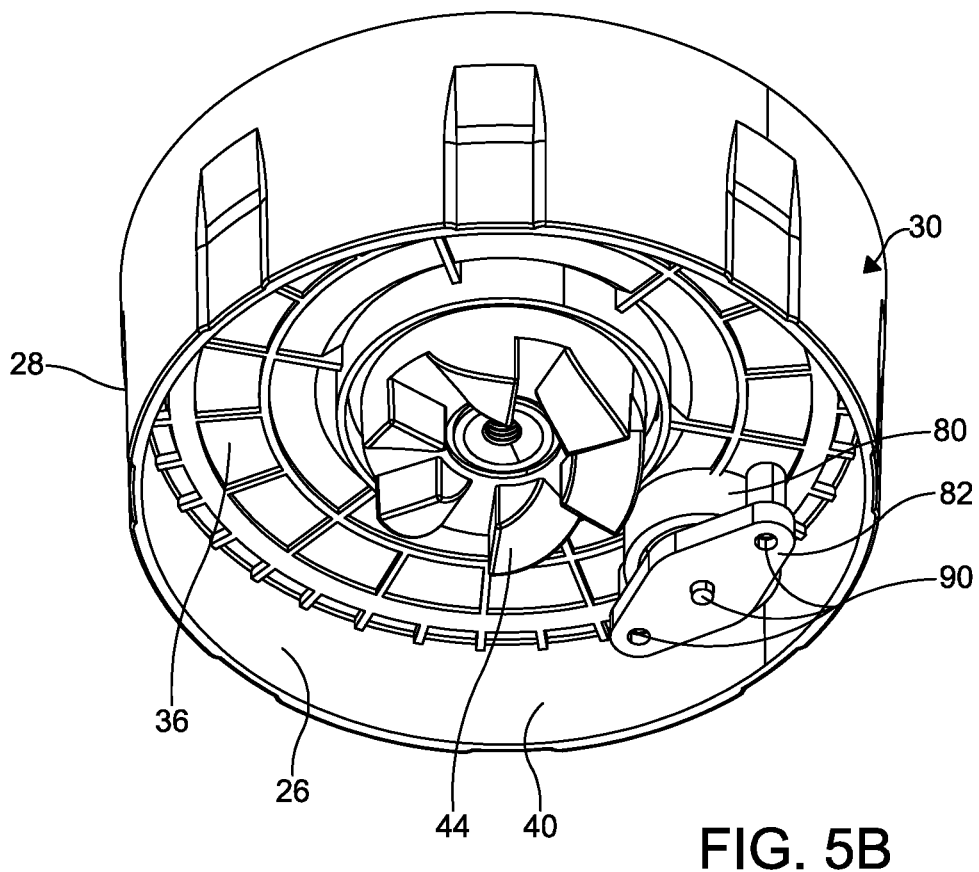
FIG. 5B is a bottom perspective view of the cutter blade base of the blender of FIGS. 1-3.

FIG. 1 illustrates a personal compact portable blender 10 with pressure control features. The blender 10 is configured for blending food products such as fruits, vegetables, ice, and liquid, for example. The blender 10 includes a bottom housing 12 for receiving internal components such as a drive device housing 50, a drive device 52, a printed circuit board (PCB) assembly 54, and a cutter blade base 30, for example. The internal components will be described in further detail herein below. In certain embodiments, a housing cover 16 is received over the bottom housing 12 for aesthetic appeal and to protect the bottom housing 12 of the blender 10. An interior 56 of the bottom housing 12 is substantially cylindrical. Though other shapes can be contemplated, if desired.

With reference to FIGS. 1-5C, the blender 10 also includes a personal sized container or vessel 14 for receiving the pre-blended and blended food products. The vessel 14 is substantially cylindrical in shape having an open end 18, a closed end 20, an outer surface 22, and an inner surface 24. A portion 25 of the outer surface 22 of the vessel 14 adjacent the open end 18 is threaded for engagement to the base 30. However, the vessel 14 can have other three-dimensional shapes such as a conical shape, a cuboid shape, any other commonly known three-dimensional shape, or a combination thereof. As shown, the vessel 14 is transparent so the food product can be seen as it is blended. However, it is understood, the vessel 14 can be opaque, if desired, or partially opaque. In certain embodiments, the vessel 14 is formed from a durable plastic material. In another embodiment, the vessel 14 can be formed from a glass material. However, it is understood, the vessel 14 can be formed from any material as desired.

The base 30 receives a blade assembly 32. The base 30 is substantially cylindrical with an inner surface 26, and an outer surface 28, and a wall 36 dividing the interior of the base 30 into an upper compartment 38 for receiving the open end 18 of the vessel 14 and a lower compartment 40 for engagement with the drive device 52. A portion 27 of the inner surface 26 of the upper compartment 38 of the base 30 is threaded for engagement with the portion 25 of the vessel 14 that is threaded. The blade assembly 32 includes a plurality of variously extending blades 34. The blades 34 are coupled to one end of a blade shaft and bearing system 42 and are received in the upper compartment 38 of the base 30. An alternate end of the blade shaft and bearing system 42 is coupled to a drive device engagement clutch 44 which extends through the lower compartment 40 of the base 30. A seal (not shown) can be disposed in the upper compartment 38 for sealing between the base 30 and the vessel 14 when coupled together.

The interior 56 receives the drive device housing 50 containing the drive device 52. When coupled together, the base 30 and the vessel 14 are removable from the bottom housing 12 as a single unit. When positioned in the bottom housing 12, at least a portion of the base 30 is received in the bottom housing 12, wherein the vessel 14 and the blades 34 are exposed. The drive device engagement clutch 44 engages the drive device 50 to impart rotation to the blades 34 via the blade shaft and bearing system 42. When the drive device 52 is operating, the vessel 14 is completely sealed to the base 30. The drive device 52 can be activated by a removeable power supply (not shown) such as a battery (not shown) operatively connected to the drive device 52. According to other embodiments, the blender 10 may include a power charger or removeable cord for connecting to a power supply such as an outlet. While not shown, it is understood a switch can be included on the bottom housing 12 for activating the power to the drive device 52. It is also understood, the drive device 52 can be activated by applying a downward pressure on the vessel 14 and the base 30 or applying a torque to the vessel 14 such that a switch or sensor activates the drive device 52.

The PCB assembly 54 is in signal communication with the drive device 52 to control the operation of the drive device 52. As shown, the PCB is located on an outer wall of the drive device housing 50. The PCB assembly 54 is operated by a series of computer programmable control logic to control how the drive device 32 operates. In application, due to the control logic, the PCB limits the operation time of the drive device 52 and as a result, the blending time is limited. For example, when a user positions the base 30 and the vessel 14 as a single unit in the bottom housing 12 and the drive device 52 is activated, a continuous operation of the drive device 52 will not exceed a predetermined interval of time such as one minute, for example. Other periods of time can be predetermined as desired. As a result, pressure within the vessel 14 has less time to increase therein.

As used herein, "continuous" operation of the drive device means "without interruption" or "unbroken." For example, "continuous" means from one activation of the drive device 52 until the one activation of drive device 52 is deactivated or from starting the blending of the food products until stopping the blending of the food products. "Continuous" does not mean a sum of multiple intervals of times from multiple activations and deactivations of the drive device 52. In another example, in application, a user may activate a first blending of the food products then deactivate the first blending of the food products during a first continuous time interval then subsequently reactivate a second blending of the same food products or separate food products then deactivate the second blending of the food products during a second continuous time interval. The first continuous time interval and the second continuous time interval are together not a single continuous activation and were interrupted by the deactivation of the first blending of the food products. However, in other embodiments it is understood the time interval can be a sum of interrupted time intervals such as during a block of time. For example, the drive device 52 may not be activated after a sum of time intervals equal to one minute in a five minute block of time occurs. Then a certain amount of time must pass before the drive device 52 can be activated again.

As shown in FIGS. 3-5B, the blender 10 may include a first pressure relief valve 60 and a second pressure relief valve 70. It is understood more than two pressure relief valves can be included with the blender 10, if desired. The first pressure relief valve 60 is formed from a soft material, as measured on a hardness scale by a durometer, such as silicon, for example. The type of material can be chosen or adjusted based on the hardness of the material depending on parameters such as preventing leakage during normal use of the blender, the ability to release gas if internal pressure in the vessel 14 exceeds a certain value, and the ability to withstand certain temperatures. The first pressure relief valve 60 is disposed in a hole 61 formed at the closed end 20 of the vessel 14 and extends through the vessel 14. The first pressure relief valve 60 includes a first flange 62 and a second flange 64. The first flange 62 engages the outer surface 22 of the vessel 14 and is received in a central recess 48 in the outer surface 22 of the vessel 14. The second flange 64 engages valve control walls 66 to bias the first pressure relief valve 60 downwardly so the first flange 62 remains sealed against the outer surface 22. Once the internal pressure within the vessel 14 exceeds the downward pressure applied to the second flange 64 by the walls 66, the second flange 64 will flex upwardly and the first flange 62 will begin to disengage from the outer surface 22 of the vessel 14 and permit the gas to escape.

The second pressure relief valve 70 is disposed in the base 30 and includes a valve head 74, a flanged portion 76, and a valve stem 78. A majority of the second pressure relief valve 70 is disposed in the lower compartment 40 of the base 30. A portion of the valve head 74 extends through a hole 71 formed in the wall 36 of the base 30 such that top surface 72 of the valve head 74 is continuous or flush with a surface of the wall 36 defining a portion of the upper compartment 38.

The second pressure relief valve 70 is positioned within a bracket assembly including a top bracket 80 and a bottom bracket 82. The top bracket 80 includes an open end 84 and a substantially closed end 86 with a hole 88 formed therethrough for receiving the valve head 74. The bottom bracket 82 is substantially planar. Three apertures 90 are formed through the bottom bracket 82. One of the apertures is to receive a portion of the valve stem 78. The other ones of the apertures 90 are for coupling the bottom bracket 82 to the top bracket 80. A spring 92 is disposed about the valve stem 78 and extends from the bottom of the valve head 74 to the bottom bracket 82. The spring 92 biases the valve head 74 towards the hole 88, with the flanged portion 76 engaging an inner surface of the top bracket 80 adjacent the hole 88, so the top surface 72 of the valve head 74 of the second pressure relief valve 70 is flush with the surface of the wall 36. Once the pressure inside the vessel 14 exceeds the pressure applied by the spring 92, the second pressure relief valve 70 will move downwardly away from the wall 36 and fluid, liquid, steam, or other gas will leak through the hole 71 in the wall 36 to the lower compartment 40. As a result, pressure within the vessel 14 is relieved and an overaccumulation of pressure within the vessel 14 is prevented.

It is understood, additional pressure relief valves can be included in various positions on the blender 10 if desired, without departing from the scope of the instant disclosure. Furthermore, the various shapes and materials of the components of the blender 10 can be chosen as desired.

In application, a user places a food product or food products within the vessel 14 to blend. Once the food products are placed within the vessel 14, the base 30 is threadingly coupled to the vessel 14. It is understood, other means of coupling the vessel 14 to the base 30 can be contemplated as desired. For example, key and slot coupling means, ball and detent coupling means, cam fittings, brackets, or any known coupling means can be employed to couple the vessel 14 to the base 30. Once the base 30 and the vessel 14 are coupled together, the base 30 is placed in the bottom housing 12 so the base 30, and more specifically, the drive device engagement clutch 44 engages the drive device 52. Once the drive device 52 is activated, the blade assembly 32 rotates causing the food products within the vessel 14 to blend.

The PCB assembly 54 and the pressure relief valves 60, 70 are pressure minimizing devices to control a pressure within the vessel 14. Advantageously, due to the PCB assembly 54 and the control logic for the PCB assembly 54, the drive device 52 will continuously activate no longer than the predetermined time to assure overaccumulation or pressure is prevented. The pressure relief valves 60, 70 also help prevent the overaccumulation of pressure within the vessel 14. As a result of these pressure relieving features, damage to the vessel 14 is minimized, sealing is maximized, efficiency and ergonomic advantages of operating the blender 10 are maximized, and the life of the blender 10 is prolonged.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A blender for blending food products comprising:
  a vessel configured for containing the food products;
  a cutter blade base having a cutter blade assembly, the cutter blade base releasably coupled to and cooperating with the vessel to seal the food products within the vessel and blend the food products, the cutter blade assembly driven by a drive device, wherein the cutter blade base includes a wall dividing the cutter blade base into an upper compartment and a lower compartment, the upper compartment releasably receiving an open end of the vessel and containing blades of the cutter blade assembly, and the lower compartment configured for coupling to a bottom housing containing the drive device; and
  a pressure minimizing device preventing an overaccumulation of pressure within the vessel as the food products are blended therein, wherein the pressure minimizing device is a pressure relief valve disposed in the cutter blade base, wherein the pressure relief valve includes a valve head, a flanged portion, and a valve stem, the pressure relief valve movable between a first position and a second position, wherein the head of the pressure relief valve seals a hole formed in the wall of the cutter blade base in the first position of the pressure relief valve, and wherein the hole fluidly connects the upper compartment with the lower compartment in the second position of the pressure relief valve.

2. The blender of claim 1, wherein the pressure relief valve is positioned in a bracket assembly, and wherein the bracket assembly cooperates with a spring to move the pressure relief valve from the first position to the second position.

3. The blender of claim 1, wherein a top surface of the valve head is planer with a surface of the wall facing the upper compartment when the pressure relief valve is in the first position.

4. A blender for blending food products comprising:
  a bottom housing containing a drive device;
  a cutter blade base having a cutter blade assembly driven by the drive device, the cutter blade base releasably received in the bottom housing, wherein a continuous operation of the cutter blade assembly does not exceed a predetermined interval of time, wherein the cutter blade base includes a wall dividing the cutter blade base into an upper compartment and a lower compartment;

a vessel configured for containing the food products having an open end and a closed end, the open end releasably coupled to the cutter blade base; and a pressure relief valve disposed in the cutter blade base, wherein the pressure relief valve is movable between a first position and a second position, wherein the pressure relief valve seals a hole formed in the wall of the cutter blade base in the first position of the pressure relief valve, and wherein the hole fluidly connects the upper compartment with the lower compartment in the second position of the pressure relief valve.

5. The blender of claim 4, wherein the pressure relief valve is disposed in the cutter blade base, the pressure relief valve configured to release a liquid from the vessel when a pressure inside the vessel exceeds a predetermined pressure.

6. The blender of claim 5, wherein a top surface of the pressure relief valve is planar with a surface of the cutter blade base.

7. The blender of claim 4, wherein the continuous operation of the cutter blade assembly for a predetermined interval of time is controlled by printed circuit board receiving a computer programmable control logic.

\* \* \* \* \*